United States Patent Office.

ALEXANDER WATT, OF WANDSWORTH, ENGLAND.

*Letters Patent No. 81,851, dated September 1, 1868.*

IMPROVED BLEACHING-SOAP.

*The Schedule referred to in these Letters Patent and making part of the same.*

TO ALL TO WHOM IT MAY CONCERN:

Be it known that I, ALEXANDER WATT, of No. 1 Ashen Villas, Merton Road, Wandsworth, in the county of Surrey, England, have invented or discovered certain new and useful Improvements in the Making of Soap; and I do hereby declare the following to be a full, clear, and exact description of the same.

My invention consists in mixing with soap certain substances which possess deodorizing and disinfecting properties, more especially the soluble hypochlorites. For this purpose I use a mixture, of about equal parts, of chloride of lime and the ordinary soda-ash of commerce.

To enable those skilled in the art to make and use my invention, I will proceed to describe the same as follows:

I add to soap in a melted state, chloride of soda, which may be conveniently done in the following way: For one ton of soap I take, say, one hundred and forty pounds of chloride of lime, and work this up into a thin paste, of a creamy consistence, with sufficient cold water, crushing any lumps which may appear with a stout piece of wood, or what is called a soap-maker's "crutch." I next dissolve with sufficient boiling water, say, one hundred and forty pounds of ordinary soda-ash. When the soda is dissolved, the solution is added to the chloride of lime, and the whole well stirred. This mixture becomes thick or solid at first, but will become thinner by continual stirring, if sufficient water has been added. If, however, this should not be the case, I add a little more cold water and again stir well. The mixture should be of a thin creamy consistence. I next pass the whole of the mixture of chloride of lime and soda through a gauze-wire sieve, of about sixteen gauge, in order to effect a more perfect mixture, and at the same time to break up any lumps which may present themselves. A wooden spatula or iron trowel may be used to force the solid particles through the sieve. When the whole of the mixture has passed through the sieve it is ready for use.

The above mixture may now be added to one ton of soap in a melted state, the temperature of which should not be higher than from 130° to 150° Fahrenheit. The mixture must be well "crutched" with the soap, and this is most conveniently done when the soap is in the frames, (except where a steam-crutch is employed.) After the "crutching" is complete, (which operation occupies only a few minutes,) the soap should be covered up, in order to retain the heat as long as possible. It is preferable to mix the chloride of lime and soda just before use, in order that the mixture may be warm when added to the soap. For some soaps it will be advisable to use a less proportion of soda than the quantity above stated, say, for instance, one part soda and two parts chloride of lime. With respect to the quantity or proportions of chloride of lime and soda which may be added to soap, this may be regulated according to the requirements of the manufacturer, the proportions given being intended to make a strong soap. For toilet-soaps, a much less proportion of the mixture may be employed, and, if preferred, a solution of the chloride of soda may be used instead of the mixture described above. The solution of chloride of soda may be obtained by simply adding more water to the mixture above described, and then allowing the lime to deposit, the supernatant liquor being carefully poured off and added to the soap as before. The chloride of soda may also be conveniently formed by employing the silicate of soda or "glass liquor" instead of the ordinary soda-ash. When the silicate is used, the chloride of lime should be worked up into a thin paste, as before described, and a moderately strong solution of glass liquor added gradually, the whole being well stirred. At first the mass solidifies, but, by continual stirring, it becomes thinner. The solution of the silica salt must be added until it ceases to thicken or solidify the mass. When wanted for use, the mixture may require to be diluted with a little water, as it is apt to solidify, if concentrated, after standing a few hours.

Having thus fully described my invention, and the manner of using the same, what I claim as new, and desire to claim by Letters Patent, is—

A soap, containing a soluble chloride or hypochlorite, mixed and compounded with a previously-made soap in a melted state, in the manner herein described.

ALEXANDER WATT.

Witnesses:
 JAMES E. NAYLOR,
 WILLIAM KURR.